J. E. LAVINE.
TRAP.
APPLICATION FILED FEB. 2, 1921.
1,408,612.
Patented Mar. 7, 1922.
2 SHEETS—SHEET 1.
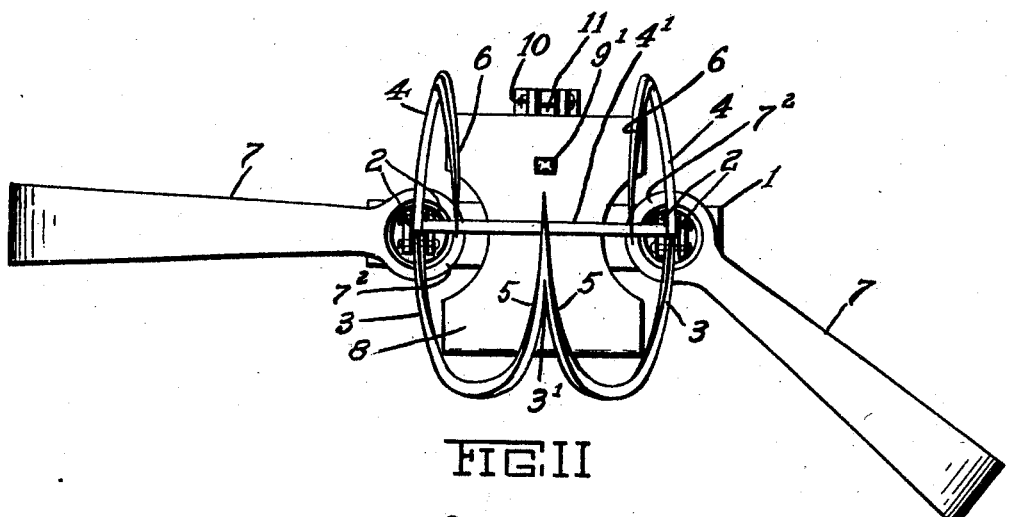
FIG. I
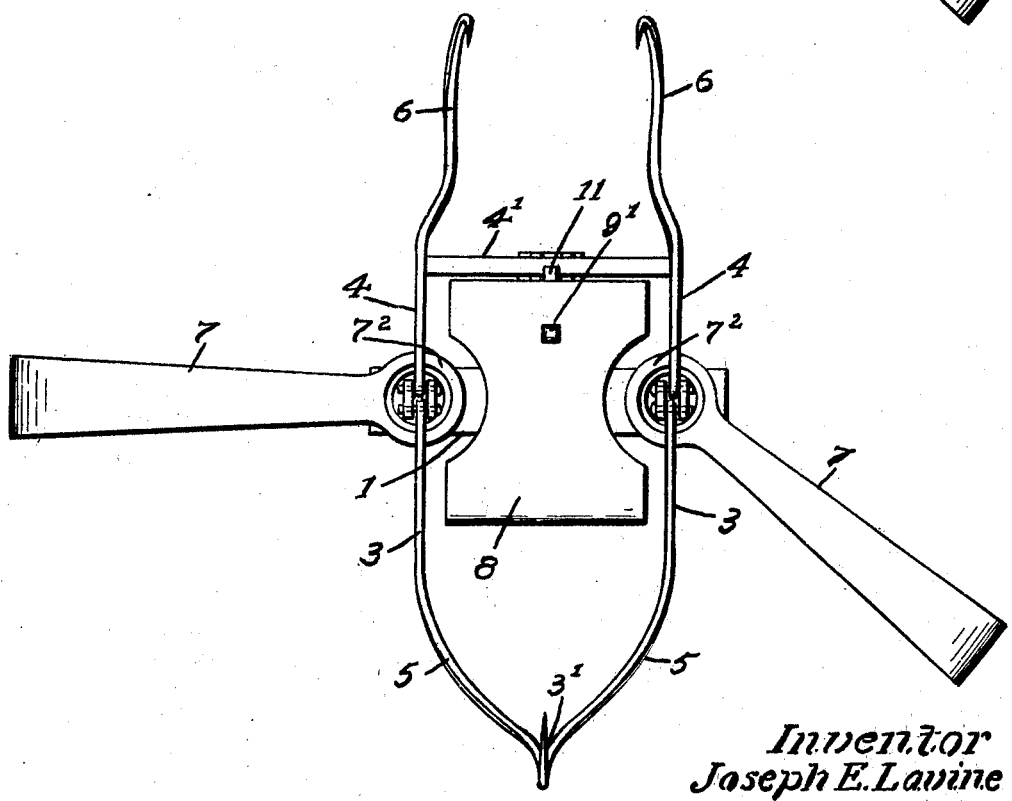
FIG. II
Inventor
Joseph E. Lavine
By ........ Attorney

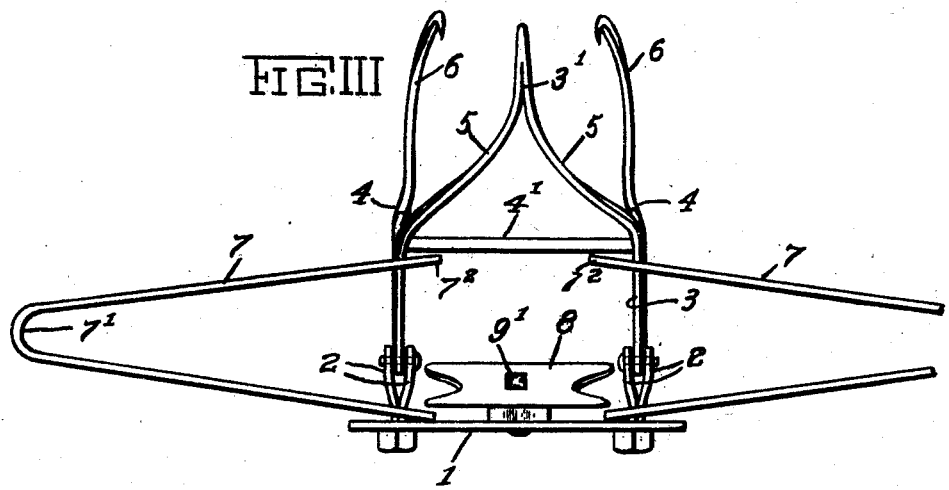
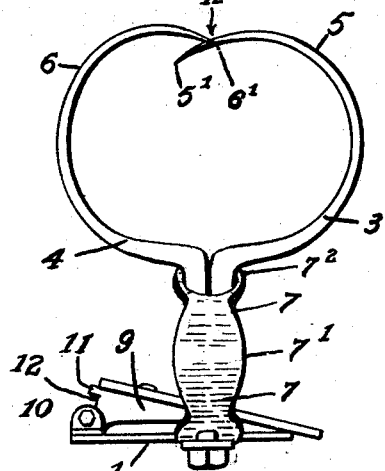
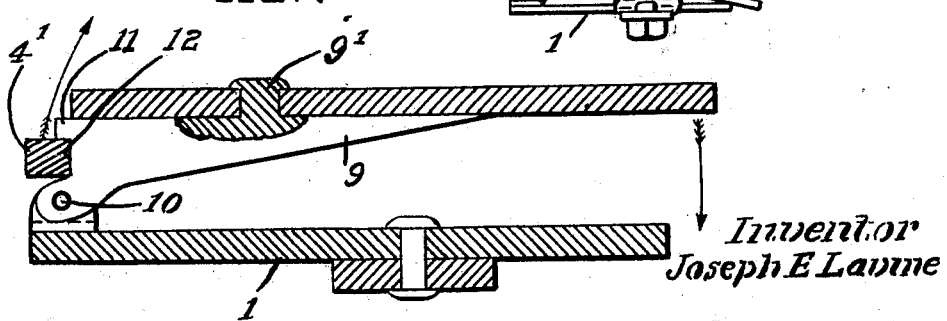

UNITED STATES PATENT OFFICE.

JOSEPH E. LAVINE, OF FITCHBURG, MASSACHUSETTS.

TRAP.

1,408,612.

Specification of Letters Patent.   Patented Mar. 7, 1922.

Application filed February 2, 1921. Serial No. 441,950.

*To all whom it may concern:*

Be it known that I, Joseph E. Lavine, a subject of George V, King of England, (who has filed declaration of intention to become a citizen of the United States,) residing at Fitchburg, county of Worcester, Commonwealth of Massachusetts, have invented certain new and useful Improvements in Traps, of which the following is a specification.

This invention relates to traps and particularly to jaw traps for the taking of four-footed animals and particularly certain fur bearing animals.

As illustrative of my invention and as an aid in the disclosure thereof I have shown in the accompanying drawings a trap which I have found well adapted to the requirements of practical trapping and highly successful in the taking of certain animals.

In accordance with my invention I provide a trap which instead of having jaws is provided with opposed striking prongs adapted to impale and kill its game with all human certainty and without the usual possibility of missing its strike or striking and leaving the game to suffer or escape in a maimed condition which would involve both suffering and ultimate destruction by natural enemies in the wild.

General structures in accordance with my invention are shown in illustrative embodiments in the accompanying drawings as well as certain details of structure which I have found of great practical importance and which are important in their combination with broader features of my invention as well as their adaptability to trapping in general. Throughout the specification and drawings like reference characters are correspondingly employed, and in the drawings:

Fig. I is a plan view closed.
Fig. II is a plan view open.
Fig. III a side elevation.
Fig. IV an end elevation, and
Fig. V a detail of pan trigger shown partly in section.

In the trap shown in the accompanying drawings I provide a base 1 after the usual manner of traps from which are raised pairs of pivot plates 2. To these plates are pivoted after the fashion of the usual jaws the opposed ends of fork members 3 and 4. Each plate pair 2 is set through the base 1 and secured thereto, as indicated at 2', Fig. III, and the individual plates of each pair extending upwardly from said base in spaced forward relation. The opposed ends of the fork members 3 and 4 are pivotally mounted in the spaces separating the individual plates of each plate pair on horizontally disposed studs $3^a$ and $4^a$, respectively, which are set through each plate pair, near their free ends, as appears in Figs. I and II. The members 3 join as at $3^1$ and terminate in the instance shown as a single tine or striking point 5. The members 4 are connected by cross bar $4^1$ and have a pair of corresponding striking points 6. The members 5 and 6 are preferably odd in number, although not necessarily so and should be so disposed as to alternate from opposite sides. In the form shown the member 5 passes between the tines 6. This is important because animals when lightly caught exert extraordinary strength and are liable to tear themselves loose by springing the tines. In the interlocked relation the tines cooperate to protect each other against individual strain if the animal struggles to escape.

The tines 5 and 6 as best shown in Fig. IV are so arched that they intersect as at the point indicated by an arrow marked X due to the slight downward turn of the tips $5^1$ and $6^1$. The tines 5 and 6 are preferably comparatively small, sharp, penetrating tines. With a suitable size trap normally sprung these tines strike in the region of the shoulder in such a manner as to either pierce the vitals or to strike adjacent to the back bone in either of which cases death is almost instantaneous and the dispatch of the game more humane and more advantageous to the condition of the pelt. The tines are small and do not damage the skin being less destructive even than shot. The members 3 and 4 are acted on by the springs 7 which are of substantially conventional type although such springs are preferably materially thickened as at $7^1$ to increase power and give balance and hold to the trap. The trigger mechanism of the trap comprises a pan 8 preferably shaped to substantially fill the opening between the members 3 and 4 being laterally notched as indicated at $8^a$, Fig. 1, to clear the annular ends $7^2$ of the spring 7. The pan is mounted on an arm 9 provided with a stud $9^1$ disposed to project through a slot in the pan and be headed over in position as shown in Fig. V.

The arm 9 is pivoted to the base 1 at 10. On the arm 9 I provide an overhanging shoulder 11 having a notch or undercut 12 adapted to receive the cross bar $4^1$ when the trap is set. The squared notch 12 is of such depth as to receive slightly less than half the width of the bar $4^1$. This permits the trap to be set delicately and yet positively. Much difficulty has been experienced in the light setting of traps by having them set too lightly so that they are sprung sometimes even by a rain drop and often by the mere falling of a twig. By means of the proportioning of my notch 12 I am able to standardize the reception of the bar $4^1$ so that it can always be positively set at a predetermined limit of fineness which will absolutely assure the release of the trap and yet have it sufficiently fine to respond to even a slight touch.

The shoulder 11 extends slightly beyond the vertical plane of the pivot 10 so that the strain is more completely a direct upward pull and the wear of the pivot thus reduced. At the same time this permits a very fine setting of the trap and a setting that will remain constant during the life of the trap even though the pivot 10 becomes slightly worn or loosened by rust or hard treatment.

My trap is set by pressing down on the upper leaves of the spring 7 thus bringing the annular or loop ends $7^2$ below the pivot plates 2, the jaws 3 and 4 may then be laid back flat as indicated at Fig. 2. The pan 8 is then raised until the shoulder 11 overlies the cross bar $4^1$ of the jaws 4. The trap is then lightly covered and prepared in that manner peculiar to the animal sought.

When the said trap is disturbed the pan will be depressed and the shoulder 11 freed from the bar $4^1$. The spring 7 is then permitted to become effective and the annular end $7^2$ in separating throws the jaws sharply together to the position indicated in Fig. IV. In this position, as will be seen in Fig. IV the points of the jaws slightly pass each other, the single point lying between the double points of the opposing jaw. On account of the downward hook of the points as shown in Fig. IV these points intersect slightly as indicated at X.

Various modifications may obviously be made in the structure and arrangement of parts all without departing from the spirit of my invention if within the limits of the appended claims.

What I therefore claim and desire to secure by Letters Patent is:

1. In a trap, a base, a pair of pivot posts spaced apart thereon, a pair of tine members pivoted in said posts, springs on each of said posts for closing said tine members, a pan pivoted to said base and operatively connected with one of said tine members whereby to releasably retain said members in set position, one of said tine members comprising a pair of arms each including a substantially semi-circular tine, the opposite tine members including a pair of curved portions united in a common point, the curvature of said portions being substantially semi-circular, and the points of said tines being so disposed that when the trap is sprung said single point will lie substantially midway between the two opposite points.

2. In a trap, a base, a pair of pivot posts spaced apart thereon, a pair of tine members pivoted in said posts, springs on each of said posts for closing said tine members, a pan pivoted to said base and disposed between said pivot posts, one of said tine members comprising a pair of arms each including a substantially semi-circular tine, a cross bar connecting said arms, the opposite tine members including a pair of curved portions united in a common point, the curvature of said portions being substantially semi-circular, and the points of said tines being so disposed that when the trap is sprung said single point will lie substantially between the two opposite points, and a detent on said pan engageable with said cross bar to releasably retain the tine members in set position.

3. In a trap, a base, a pair of pivot posts spaced apart thereon, a pair of tine members pivoted in said posts, springs on each of said posts for closing said tine members, a pan pivoted to said base and operatively connected with one of said tine members whereby to releasably retain said members in set position, one of said tine members comprising a pair of arms each consisting of a short straight section and a substantially semicircular shaped tine having its point extended slightly beyond the line of said straight portion, the opposite tine members comprising a pair of substantially straight portions and a pair of curved portions united in a common point, the rearward curvature of said portions being substantially semi-circular, and the point extended beyond the line of the straight portions and disposed so that when the trap is sprung said single point will lie substantially midway between the two opposite points and so that all of said points cross the line between the straight portions of the tine members.

In testimony whereof I affix my signature in presence of two witnesses.

JOSEPH E. LAVINE.

Witnesses:
MARION E. JOY,
JOHN J. FITZGIBBON.